No. 637,918. Patented Nov. 28, 1899.
G. W. BEAM.
GRAIN HARVESTER ELEVATOR.
(Application filed Oct. 10, 1898.)
(No Model.) 3 Sheets—Sheet 1.
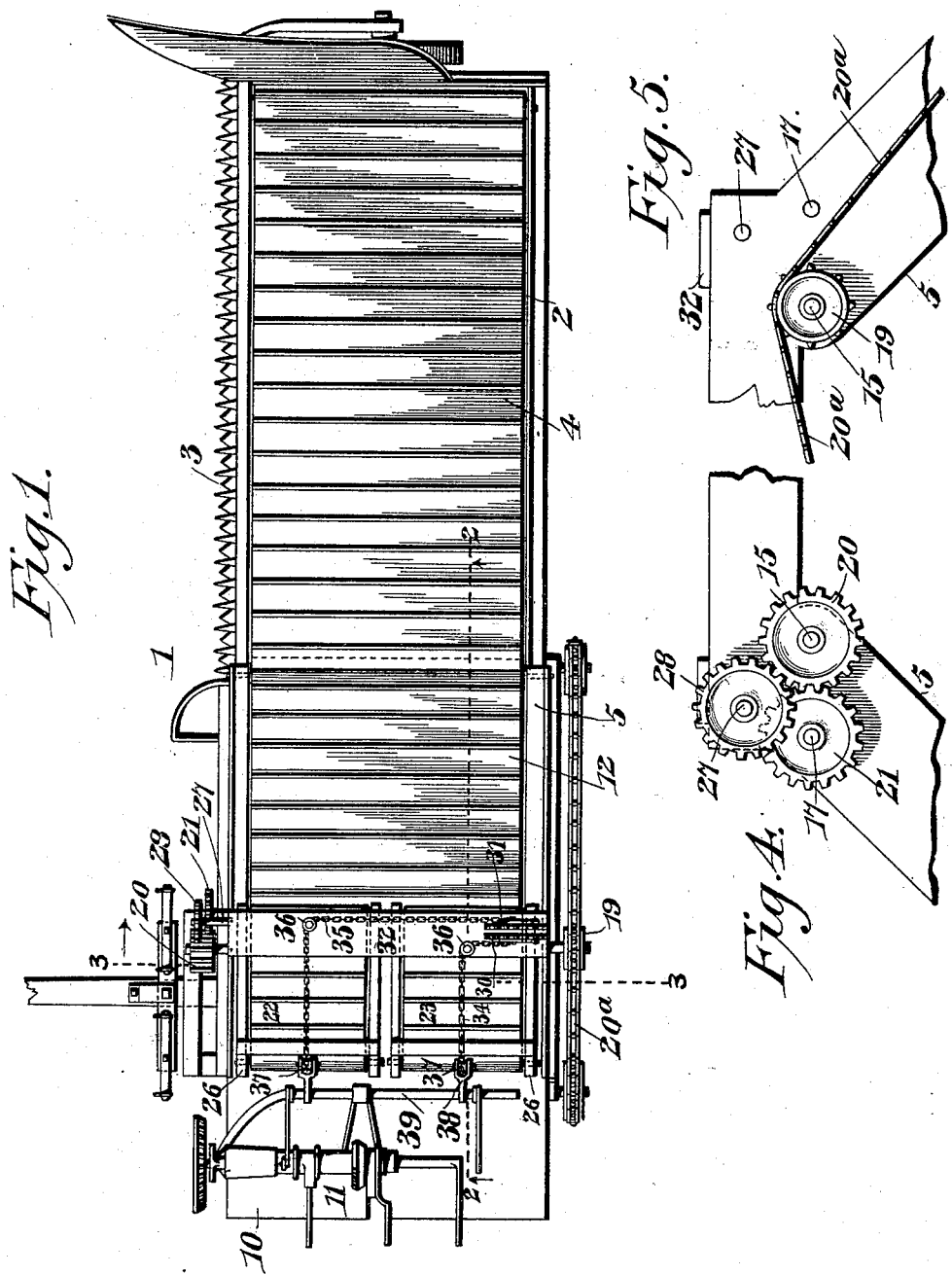
Witnesses
George W. Beam, Inventor
By his Attorneys.

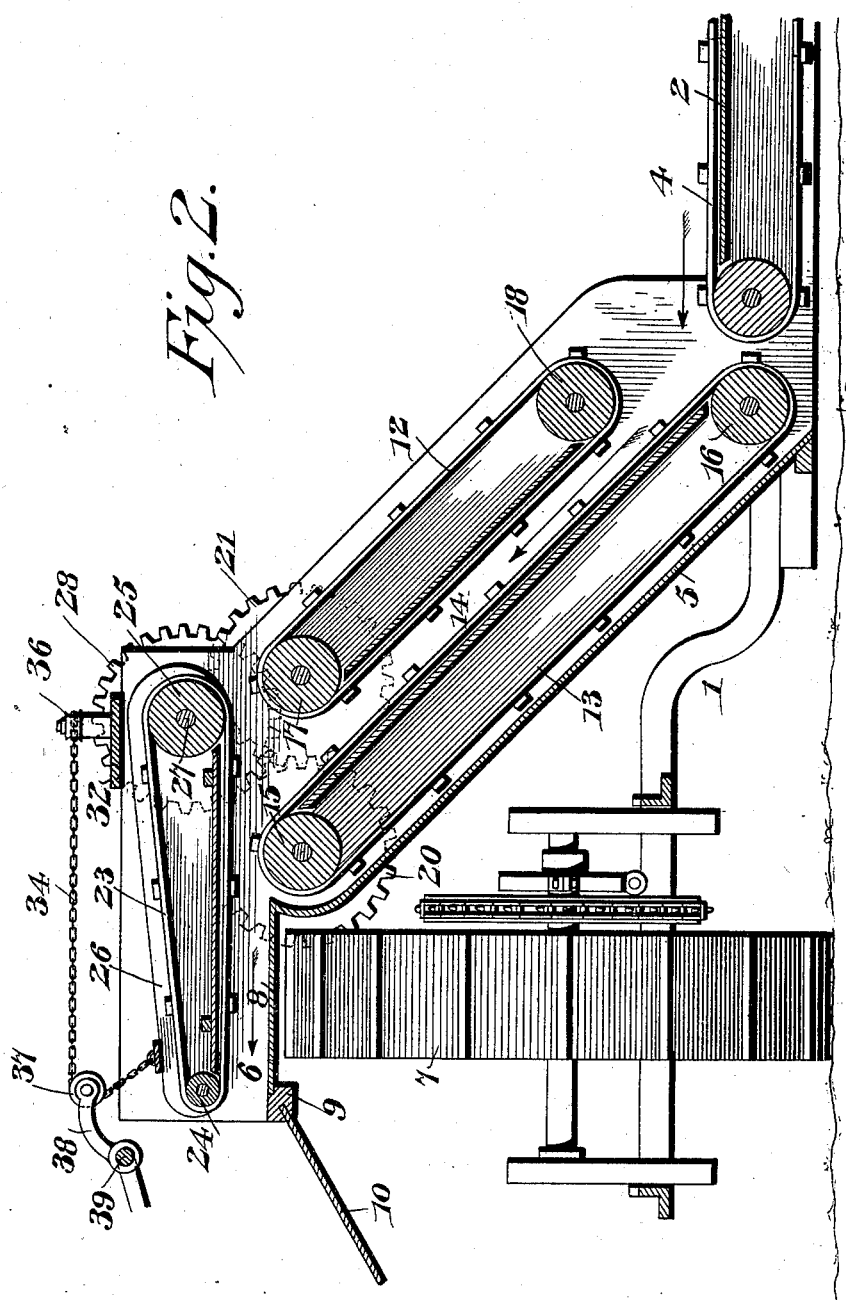

No. 637,918. Patented Nov. 28, 1899.
G. W. BEAM.
GRAIN HARVESTER ELEVATOR.
(Application filed Oct. 10, 1898.)
(No Model.) 3 Sheets—Sheet 3.
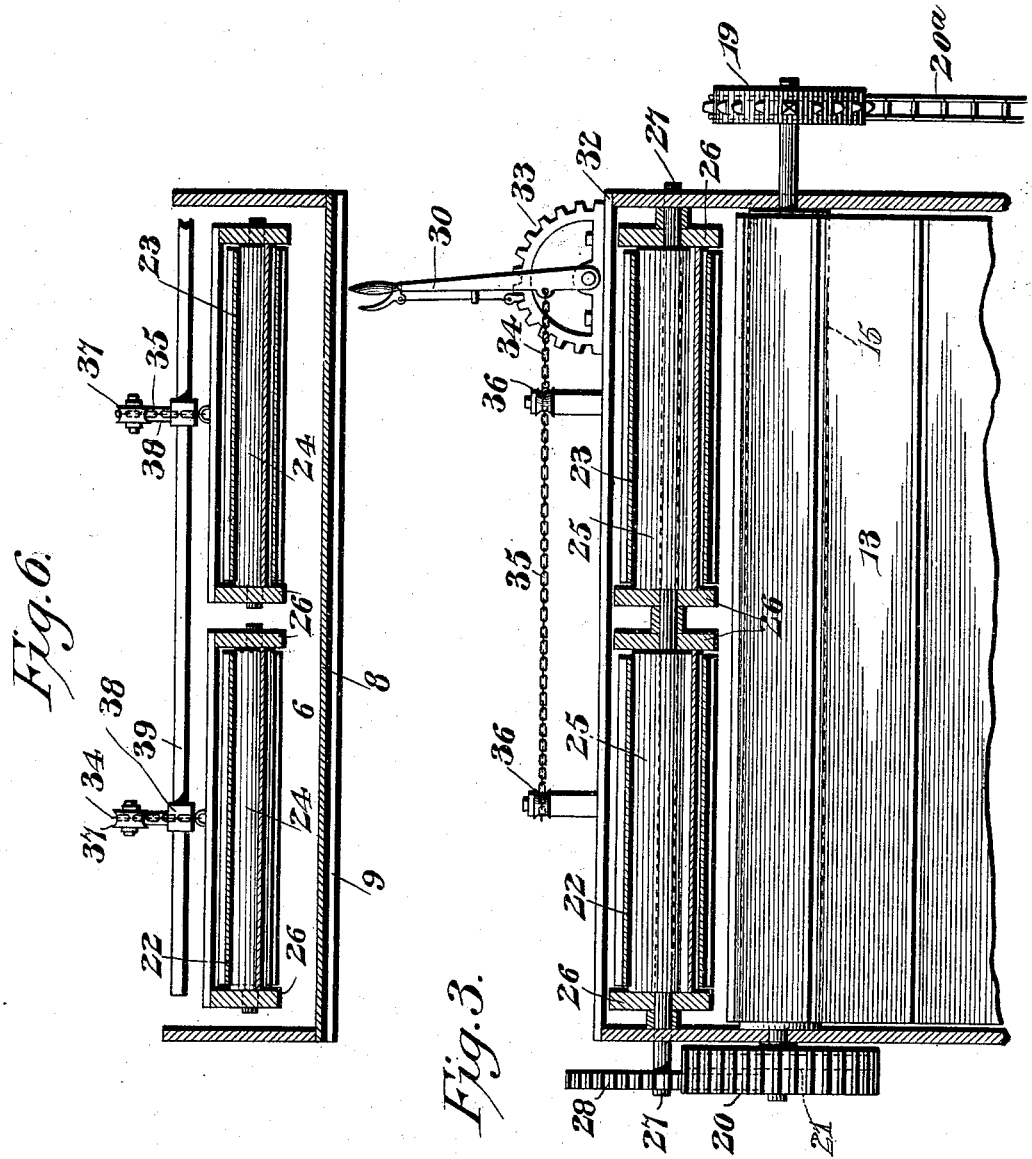
Witnesses
George W. Beam, Inventor
By his Attorneys,

UNITED STATES PATENT OFFICE.

GEORGE WASHINGTON BEAM, OF OAKLAND CITY, INDIANA.

GRAIN-HARVESTER ELEVATOR.

SPECIFICATION forming part of Letters Patent No. 637,918, dated November 28, 1899.

Application filed October 10, 1898. Serial No. 693,175. (No model.)

*To all whom it may concern:*

Be it known that I, GEORGE WASHINGTON BEAM, a citizen of the United States, residing at Oakland City, in the county of Gibson and State of Indiana, have invented a new and useful Grain-Harvester Elevator, of which the following is a specification.

This invention relates to grain harvesting and binding machines, and has special reference to the elevating mechanism by which the grain is taken from the platform-carrier and elevated and delivered to the binding mechanism.

To this end the invention primarily has for its object the provision of an improved elevator attachment for self-binding harvesting-machines involving a low elevation and a direct delivery of the grain to the packers of the binding mechanism without obstruction or the use of the front and rear butters and the top deflector, such as are commonly employed in some types of harvesters and binders.

A further object of the invention is to provide an improved elevating mechanism for harvesting-machines, so constructed as to obviate the choking or filling up of the grain between the top rollers of the inclined elevator-aprons usually employed in harvesting-machines, while at the same time providing simple and efficient means for straightening the grain by increasing or diminishing the pressure on either the heads or butts thereof, and thereby causing the grain to be delivered in a thoroughly-straightened condition to the packers of the binding mechanism.

With these and other objects in view, which will readily appear as the nature of the invention is better understood, the same consists in the novel construction, combination, and arrangements of parts hereinafter more fully described, illustrated, and claimed.

While the improvements contemplated by the present invention are necessarily susceptible to modification, the preferred embodiment thereof is illustrated in the accompanying drawings, in which—

Figure 1 is a top plan view of a self-binding harvesting-machine embodying the elevating mechanism constructed and arranged in accordance with the present invention. Fig. 2 is a longitudinal sectional view on the line 2 2 of Fig. 1. Fig. 3 is a transverse sectional view of the top delivery-table of the elevating mechanism, the line of section being on the line 3 3 of Fig. 1 and including the pair of delivery-carriers arranged above the table. Figs. 4 and 5 are detail elevations, respectively, of opposite sides of the elevator-frame, showing the gearing for driving the elevator-aprons and delivery-carriers. Fig. 6 is a view similar to Fig. 3 looking in the opposite direction.

Referring to the accompanying drawings, the numeral 1 designates a self-binding harvesting-machine of any approved pattern, having the usual platform 2, at the front end of which is located the usual cutting apparatus 3, and which supports the horizontal endless platform-carrier 4, extending from end to end thereof and serving to carry the cut grain to the inclined elevator-frame 5 at one end thereof. The inclined elevator-frame 5, which is located in its usual position at one end of the platform 2, has extended from its upper end a substantially horizontal portion 6, overhanging the main ground-wheel 7 of the machine, and in the present invention the inclined elevator-frame 5 and its approximately horizontal top portion 6 do not project to as great an elevation above the ground-wheel as the elevator-frames of most types of self-binders now in use, and this feature of the invention is of importance, as it provides for a lower elevation of the grain than has heretofore been possible.

In the present invention the horizontal top portion of the elevator-frame is inclosed at the bottom by a flat delivery-table 8, which is rigidly supported and is disposed directly above the main ground-wheel 7, forming the guard or fender therefor, and at the outer edge of said delivery-table 8 is located the usual deck-support 9, which provides for the support of the binder-deck 10, projected beyond and in line with the table 8 at the stubbleward side of the machine. Coöperating with the binder-deck 10 is the binding mechanism 11, but no description of this mechanism is necessary, as the same forms no part of the invention.

The inclined elevator-frame 5 at one end of the platform-carrier 4 has arranged therein the usual pair of inclined upper and lower elevator-aprons 12 and 13, respectively. The elevator-aprons 12 and 13 are arranged in substantial parallelism to each other and spaced a sufficient distance apart to form therebetween the elevating passage or space 14, the lower end of which passage or space receives therein the grain from the platform-carrier 4, said grain being caught up between the opposing sides of the aprons 12 and 13 and elevated between such aprons to the upper end of the elevator-frame. At this point it will be observed that the lower inclined elevator-apron 13 is arranged to pass over the oppositely-located top and bottom apron-rollers 15 and 16, respectively, while the upper elevator-apron 12 passes over corresponding top and bottom apron-rollers 17 and 18, respectively, and in carrying out the present invention the top apron-rollers 15 and 17 of the elevator-aprons are arranged in substantially the same horizontal plane and in substantial alinement with the flat delivery-table 8 above the main ground-wheel 7, thereby permitting the elevator-frame to be constructed so that its horizontal top portion 6 will lie close to the top of the ground-wheel, so that the binder attachment will be elevated as low as possible. The shaft extremities of the apron-rollers 15, 16, 17, and 18 are journaled in suitable bearings in the sides of the elevator-frame, and one of the shaft extremities of the top apron-roller 15 of the lower elevator-apron has fitted thereto at the rear side of the machine a sprocket-wheel 19, which receives a drive-chain 20ª, driven by suitable gear connections with the main driving parts of the machine, and on its shaft extremity on the front side of the machine opposite the sprocket-wheel 19 the top roller 15 for the lower elevator-apron carries a spur-gear 20, having a wide periphery and meshing with an adjacent gear-wheel 21, fitted to one of the shaft extremities of the top roller 17 for the upper inclined elevator-apron 12.

The grain which is elevated between the elevator-aprons 12 and 13 passes out between the top apron-rollers 15 and 17 and is caught up by the under sides of the pair of upper independent delivery-carriers 22 and 23, arranged side by side within the horizontal top portion 6 of the elevator-frame and disposed normally at an obtuse angle to the inclined elevator-aprons 12 and 13 below the same. The delivery-carriers 22 and 23 may be properly described as being horizontally arranged within the top portion of the elevator-frame directly above the flat delivery-table 8; but each of said delivery-carriers 22 and 23 is entirely independent of the other and is independently movable and adjustable, whereby provision is made for the ready straightening of the grain at the heads or butts without the use of the ordinary butters.

Each of the delivery-carriers 22 and 23 is an ordinary endless conveyer belt, and is arranged to pass over a pair of oppositely-located carrier-rollers 24 and 25, mounted within opposite ends of a vertically-movable hinged carrier-frame 26, substantially comprising parallel side members connected at suitable points by transverse braces. The carrier-rollers 25 for both of the delivery-carriers 22 and 23 are mounted on a common pivot-shaft 27, journaled at its extremities in the sides of the elevator-frame and having mounted on one end at the front side of the machine a gear-wheel 28, which meshes with the wide-faced spur-gear 20 and overlaps the gear 21 for the top roller 17 of the elevator-apron 12, so as to close up the space between the rollers 25 and 17, it being observed that the rollers 25 for the carriers 22 and 23 are located in a plane directly above the top roller 17, so as to dispose the carriers 22 and 23 directly over the top end of the elevating passage or space 14.

The vertically-movable hinged carrier-frames 26 for the delivery-carriers 22 and 23 have a pivotal connection at one end with the common pivot-shaft 27, so that their opposite ends will be free to move up and down, and thereby permit the carriers 22 and 23 to independently and automatically adjust themselves to the amount of grain passing between the same and the delivery-table 8, and in order to provide for the independent adjustment of the carriers 22 and 23, so as to straighten out the grain in a manner to be presently explained, a pair of adjusting-levers 30 and 31 are employed. The adjusting-levers 30 and 31 are mounted on a suitable support 32, arranged transversely of the top portion of the elevator-frame and disposed longitudinally of and above the pivot-rollers 25 for the delivery-carriers, so as not to interfere with the pivotal or oscillatory movement of the carriers, while at the same time disposing the levers within convenient reach of the driver. The adjusting-levers 30 and 31 cooperate with ordinary locking-segments 33, and said levers have respectively connected thereto one end of the chains or flexible adjusting connections 34 and 35. The adjusting-chain 34 connects with the lever 30 and passes from its point of connection with the lever around a guide-pulley 36, arranged on the support 32, and from thence extends to a guide-pulley 37, mounted within the supporting-bracket 38, attached to the breastplate-support 39 of the binding attachment. The end of the chain 34, opposite its connection with the lever 30, connects with the unpivoted end of the frame for the delivery-carrier 23. The adjusting chain or connection 35 passes around similar guide-pulleys 36 and 37, but has its ends respectively connected with the lever 31 and the unpivoted end of the frame 26 for the delivery-carrier 22. It will thus be seen that each of the delivery-carriers has an independent adjusting connection therewith, so that the same may be adjusted up or down, so as to lighten or increase the pressure thereof on the grain. By the independent adjustment of the carriers 22 and 23 it will be understood that the pressure on the heads or butts of the grain may be changed to make such heads or butts move faster or slower, as may be required to straighten the grain and provide for the delivery thereof to the binder-deck 10 in a perfectly straight and even condition. It will thus be seen that while the carriers 22 and 23 readily adjust themselves or yield to the varying quantity of grain, so as to obviate choking and provide for a free delivery of the grain to the binder, the said carriers also perform the important functions of adjusters to straighten the grain without the use of butters and other accessories for this purpose which ordinary self-binders are usually provided with.

From the foregoing it is thought that the construction, operation, and many advantages of the herein-described grain-elevator mechanism for harvesters will be readily apparent to those skilled in the art without further description, and it will be understood that various changes in the form, proportion, and the minor details of construction may be resorted to without departing from the principle or sacrificing any of the advantages of this invention.

Having thus described the invention, what is claimed as new, and desired to be secured by Letters Patent, is—

1. In a harvester, the combination with the platform and the binder attachment, of the elevator-frame having its top portion provided with a flat-bottom delivery-table contiguous to the binder-deck and overhanging the ground-wheel of the machine, the elevator-aprons having their top rollers arranged in substantially the same horizontal plane in alinement with said delivery-table, and a pair of independent self-adjusting, and vertically-movable, carriers arranged within the top of the elevator-frame above said delivery-table and working respectively on the head and butt portions of the grain, substantially as set forth.

2. In a harvester, the combination with the elevator and the binder, of a pair of independent self-adjusting and vertically-movable delivery-carriers arranged side by side within the top part of the elevator-frame, and respectively bearing upon the head and butt portions of the grain, substantially as set forth.

3. In a harvester, the combination with the elevator and the binder, of a pair of delivery-carriers arranged within the top part of the elevator-frame and working respectively on the head and butt portions of the grain, and means for independently adjusting said carriers to regulate the pressure thereof on the grain, substantially as set forth.

4. In a harvester, the combination with the elevator and the binder, of a pair of independent self-adjusting and vertically-movable carriers arranged within the top part of the elevator-frame and working respectively on the head and butt portions of the grain, and separate adjusting means for each carrier to regulate the pressure thereof on the grain, substantially as set forth.

5. In a harvester, the combination with the elevator and the binder, of a pair of vertically-swinging carrier-frames arranged within the top part of the elevator-frame and each having oppositely-located rollers, delivery-carriers arranged over the rollers in the carrier-frames, a common pivot-shaft pivotally supporting the carrier-frames at one end, and a separate adjusting connection with the free swinging end of each carrier-frame, substantially as set forth.

6. In a harvester, the combination with the platform and the binder, of the elevator-frame having its top portion provided with a horizontal flat-bottom delivery-table, the parallel inclined elevator-aprons arranged within the inclined portion of the elevator-frame, a pair of independent vertically-movable delivery-carriers arranged within the top part of the elevator-frame, a common pivot-shaft pivotally supporting one end of the frame of each delivery-carrier, a direct gear connection between said pivot-shaft and the shaft extremities of the top rollers for the elevator-aprons, and a separate adjusting connection with the free swinging end of each carrier-frame, substantially as set forth.

7. In a harvester, the combination with the elevator, and the binder, of a pair of vertically-swinging carrier-frames arranged within the top part of the elevator-frame and each carrying an endless delivery-carrier, a common pivot-shaft pivotally supporting the carrier-frames at one end, a transverse support arranged on top of the elevator-frame, a pair of adjusting-levers mounted on said support, and separate adjusting connections leading from the said levers respectively to the free swinging ends of the separate carrier-frames, substantially as set forth.

In testimony that I claim the foregoing as my own I have hereto affixed my signature in the presence of two witnesses.

GEORGE WASHINGTON BEAM.

Witnesses:
ALVA FOWLER,
W. T. PHILLIPS.